(12) United States Patent
Fletcher (10) Patent No.: US 8,186,597 B1
(45) Date of Patent: May 29, 2012

(54) MAGNETIC METHOD FOR SECURING A SCANNER

(75) Inventor: Donna M. Fletcher, Auburn, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 0 days.

(21) Appl. No.: 13/022,717

(22) Filed: Feb. 8, 2011

(51) Int. Cl.
*G06K 7/10* (2006.01)

(52) U.S. Cl. ......... 235/472.01; 235/462.25; 235/462.43; 235/462.45

(58) Field of Classification Search ............. 235/472.01, 235/462.25, 462.43, 462.45
See application file for complete search history.

(56) References Cited

U.S. PATENT DOCUMENTS

| | | | | |
|---|---|---|---|---|
| 6,015,091 A | * | 1/2000 | Rockstein et al. | 235/472.01 |
| 7,190,817 B1 | | 3/2007 | Schneider et al. | |
| 7,475,823 B2 | * | 1/2009 | Brock et al. | 235/462.25 |
| 7,832,641 B2 | * | 11/2010 | Blake et al. | 235/462.06 |
| 2004/0058705 A1 | * | 3/2004 | Morgan et al. | 455/556.1 |
| 2004/0149829 A1 | * | 8/2004 | Boucher et al. | 235/462.43 |
| 2007/0017997 A1 | * | 1/2007 | Talley et al. | 235/462.43 |
| 2008/0078794 A1 | | 4/2008 | Fletcher et al. | |
| 2009/0158423 A1 | | 6/2009 | Orlassino et al. | |
| 2009/0166414 A1 | * | 7/2009 | Mori et al. | 235/383 |
| 2010/0127661 A1 | | 5/2010 | Stocking | |
| 2011/0017828 A1 | * | 1/2011 | Pine | 235/472.01 |

* cited by examiner

*Primary Examiner* — Allyson Trail (74) *Attorney, Agent, or Firm* — Hiscock & Barclay, LLP (57) ABSTRACT

An indicia reading system including: a hand held indicia reader for reading information bearing indicia; a cradle having a first magnetic attachment device disposed in the cradle arm for removably holding the indicia reader; a second attachment device disposed on the indicia reader to removably attach the indicia reader to the first magnetic attachment device.

18 Claims, 6 Drawing Sheets

MAGNETIC METHOD FOR SECURING A SCANNER

FIELD OF THE INVENTION

The present invention relates to indicia reading devices, and more particularly to a magnetic method for securing an indicia reader.

BACKGROUND

Indicia reading devices (also referred to as scanners, laser scanners, image readers, indicia readers, etc.) typically read data represented by printed or displayed information bearing indicia (IBI), (also referred to as symbols, symbology, bar codes, etc.) For instance one type of a symbol is an array of rectangular bars and spaces that are arranged in a specific way to represent elements of data in machine readable form. Indicia reading devices typically transmit light onto a symbol and receive light scattered and/or reflected back from a bar code symbol or indicia. The received light is interpreted by a processor which performs signal and/or image processing to extract the data represented by the symbol. Optical indicia reading devices typically utilize visible or infrared light. Laser indicia reading devices typically utilize transmitted laser light.

One-dimensional (1D) indicia readers are characterized by reading data that is encoded along a single axis, in the widths of bars and spaces, so that such symbols may be read from a single scan along that axis, provided that the symbol is sampled with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, some or all of which must be scanned and decoded, then linked together to form a complete message. Scanning still requires relatively higher resolution in one dimension only, but multiple linear scans at different locations on a second dimension are needed to read the whole symbol.

A class of bar code symbologies known as two dimensional (2D) matrix symbologies have been developed which require image based reading and offer greater data densities and capacities than 1D symbologies. 2D matrix codes encode data as dark or light data elements within a regular polygonal matrix, accompanied by graphical finder, orientation and reference structures.

Often times an indicia reader may be portable and wireless in nature thereby providing added flexibility. In these circumstances, such readers form part of a wireless network in which data collected within the terminals is communicated to a host computer situated on a hardwired backbone via a wireless link. For example, the readers may include a radio or transceiver for communicating with a remote computer.

Efforts regarding such systems have led to continuing developments to improve their versatility, practicality and efficiency.

DETAILED DESCRIPTION

Reference will now be made to exemplary embodiments which are illustrated in the accompanying drawings. Other embodiments may be in various forms and the exemplary embodiments should not be construed as limited to the embodiments set forth herein. Rather, these representative embodiments are described in detail so that this disclosure will be thorough and complete, and will fully convey the scope, structure, operation, functionality, and potential applicability to those skilled in the art. Wherever possible, the same reference numbers will be used throughout the drawings to refer to the same or like parts. The term "scan" or "scanning" used herein refers to reading or extracting data from an information bearing indicia (or symbol). The term imaging used herein refers to the taking or creation of an electronic image.

Exemplary methods may be conceived to be a sequence of steps or actions leading to a desired result and may be implemented as software. While it may prove convenient to discuss such software as if were embodied by a single program, most implementations will distribute the described functions among discrete (and some not so discrete) pieces of software. These pieces are often described using such terms of art as "programs." "objects." "functions." "subroutines," "libraries," ".dlls." "APIs." and "procedures." While one or more of these terms may find favor in the present description, there is no intention to limit the invention to the described configurations.

In general, the sequences of steps in the present methods require physical manipulation of physical quantities. These quantities take the form of optical, electrical or magnetic signals capable of being stored, transferred, combined, compared or otherwise manipulated. Those of ordinary skill in the art conveniently refer to these signals as "bits", "values", "elements", "symbols", "characters", "images", "terms", "numbers", or the like. It should be recognized that these and similar terms are to be associated with the appropriate physical quantities and are merely convenient labels applied to these quantities.

With respect to the software described herein, those of ordinary skill in the art will recognize that there exist a variety of platforms and languages for creating software for performing the methods outlined herein. Those of ordinary skill in the art also recognize that the choice of the exact platform and language is often dictated by the specifics of the actual system constructed, such that what may work for one type of system may not be efficient on another system. It should also be understood that the methods described herein are not limited to being executed as software on a computer or DSP (Digital Signal Processor), but may also be implemented in a hardware processor. For example, the methods may be implemented with HDL (Hardware Design Language) in an ASIC.

Figure 1:
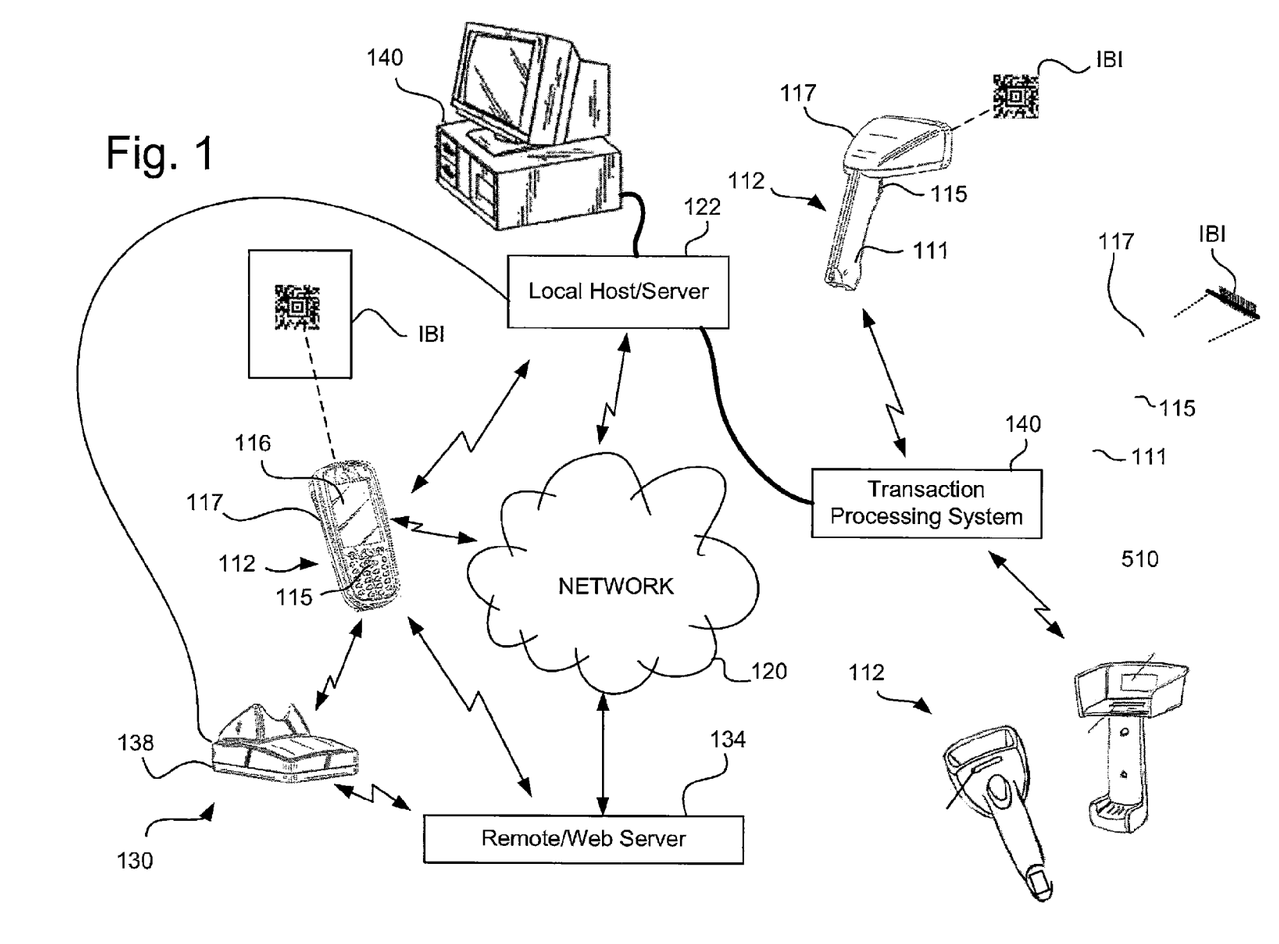
FIG. 1 is a block diagram of an exemplary indicia reader system.

FIG. 1 illustrates an exemplary scanning system, wherein a plurality of indicia readers 112 operated and utilized where information bearing indicia (IBI) are present. The indicia readers may be stationary or hand-held and may be either laser indicia reading devices (or laser scanners) utilizing transmitted laser light or optical indicia reading devices utilizing image capturing devices for extracting data from IBIs.

An operator may aim a hand-held indicia reader 112 at a target containing an IBI, dataform, text, or other data to be collected and actuate a button or trigger 115 on the indicia reader to control full or partial operation of the reader, such as to activate scanning of an IBI. An IBI or dataform may be an originally machine generated symbology that is also machine readable, such as a 1-D barcode, a 2-D barcode, a 1-D stacked barcode, a logo, glyphs, color-codes, and the like.

An exemplary indicia reader 112 may be a mobile device, such as a hand held scanner, a portable data terminal (PDT), personal digital assistant (PDA), mobile phone, etc. A Portable Data Terminal, or PDT, is typically an electronic device that is used to enter or retrieve data via wireless transmission (WLAN or WWAN) and may also serve as an indicia reader used in stores, warehouse, hospital, or in the field to access a database from a remote location. Personal Digital Assistants (PDAs) are handheld devices typically used as a personal organizer, and may have many uses such as calculating, use as a clock and calendar, playing computer games, accessing the Internet, sending and receiving E-mails, use as a radio or stereo, video recording, recording notes, use as an address book, and use as a spreadsheet. An exemplary indicia reader may have a display 116. An exemplary indicia reader 112 may have a number of subsystems provided within a housing 117 configured to be hand held. For example, the reader may have a handle portion 111.

Exemplary indicia readers may be in communication (wired or wireless) to a local transaction processing system 140, such as a cash register, customer station or employee station or local host/server 122 directly or through a charging station, base or cradle 138, 510. An exemplary local server 122 or indicia reader 112 may be in communication with network 120 and or a remote/web server 134.

Figure 2:
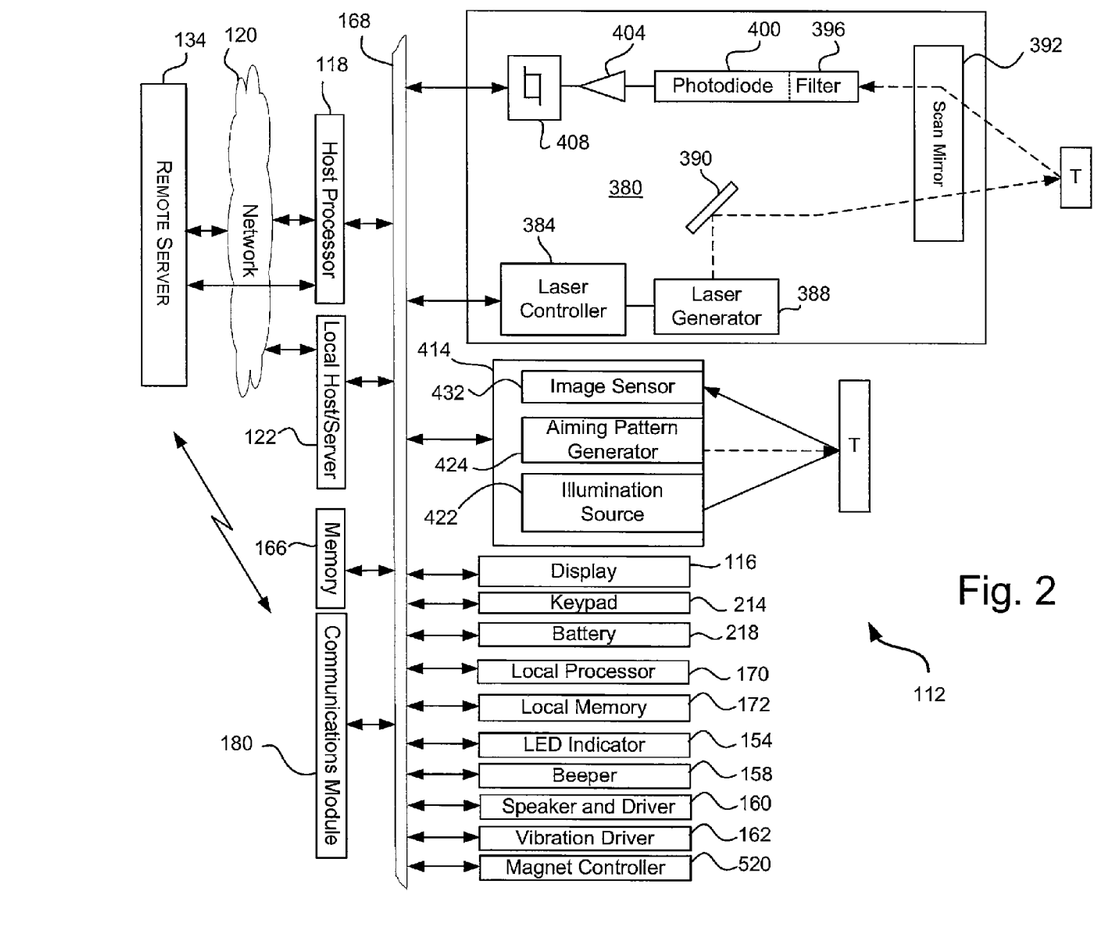
FIG. 2 is a simplified schematic block diagram of an exemplary indicia reader.

Referring to FIG. 2, an exemplary indicia reader 112 may comprise a number of exemplary subsystems, such as laser scan engine 380 or laser scanning reader system for reading indicia on a target T. The laser scanning reader system may comprise a laser controller 384 for controlling a laser generator 388 for generating a laser light beam which is directed onto a folding mirror 390 which then directs the laser light beam to an oscillating or rotating scan mirror 392 to project a scanning pattern onto target T. The laser scanning pattern is reflected off of the target and redirected by scan mirror 392 into a receive path comprising a laser light pass filter 396, a photodiode 400, an amplifier 404 and a digitizer 408.

Laser light may be described as a spatially coherent, narrow low-divergence beam of light.

Digitizer 408 may convert an analog signal output by the photodiode into a digital signal representative of the light reflected off of the targets.

Exemplary laser scanners use a laser beam as the light source and employ either a reciprocating mirror or a rotating prism to scan the laser beam back and forth across the IBI. One or more photodiodes are used to measure the intensity of the light reflected back from the bar code. The light emitted by the reader is rapidly varied in brightness with a data pattern and the photodiode receive circuit is designed to detect only signals with the same modulated pattern.

An exemplary photodetector or photosensor may be comprised of one or more photodiodes that converts incident light energy into electric charge that is an output signal representative of light reflected off an IBI. The output of the photodetector may be processed utilizing one or more functions or algorithms to condition the signal appropriately for use in further processing downstream, including decoding of IBIs.

An exemplary indicia reader 112 may comprise one or more optical image engines (image indicia reader systems or optical scan engines) 610 for reading indicia on a target T. Optical image engines capture and read images to detect and decode IBIs located within the captured images. The optical image indicia reader systems may comprise one or more illumination source(s) 618 for illuminating an IBI with a beam or pattern of incoherent light in the form of an illumination pattern and an image sensor 626 for converting light reflected off a target T having an IBI provided thereon into representative output signals thereof. The output signal of the image sensor may be processed utilizing one or more functions or algorithms to condition the signal appropriately for use in further processing downstream, including decoding of IBIs.

An exemplary image sensor converts light or other electromagnetic energy reflected off of a target and provides an output signal representative thereof. Image sensors may be an array of pixels adapted to operate in a global shutter or full frame shutter, mode or alternately operate in a rolling shutter mode. It may be a color, monochrome or monocolor 2D solid state image sensor implemented in any of CCD, CMOS, NMOS, PMOS, CID, CMD, back-illuminated technologies. The reader may be able to operate in either a progressive scan or interleaved scan mode. The image sensor may contain an array of light sensitive photodiodes (or pixels) that convert incident light energy into electric charge. Many solid state image sensors also allow regions of a full frame of image data to be addressed.

Other exemplary reader subsystems or components supported by the housing may include one or more local or on board processor(s) 170, local memory 172, a battery 218, a display 116, a key pad 214 and a wireless communications module 180. The subsystems may communicate via one or more bus 168, data lines or other signal or data communication form. The indicia reader may communicate with one or more host processor(s) 118, a local host/server 122, local memory 166, network 120 or remote server host/server 134.

Communications module 180 may provide a communication link from imaging reader 112 to other indicia readers or to other systems such as a server/remote processor 134.

The processor(s) may be disposed on board or within the housing with other subsystems. The particulars of the functionality of the processor(s) and the reader may be determined by or based upon certain configuration settings or data which may be stored in firmware, remote or local memory. Configuration settings may be arranged as stored parameter tables.

An exemplary processor may be a mixed-signal array with on-chip controller devices designed to replace multiple traditional MCU-based system components with one single-chip programmable device. It may include configurable blocks of analog and digital logic, as well as programmable interconnects.

The subsystems in the reader may be connected by one or more bus 168, data lines or other signal or data communication form. Exemplary forms may be an Inter-IC bus such as a two wire interface (TWI), dedicated data bus, RS232 interface, USB, etc.

The processor(s) may include a predetermined amount of memory for storing firmware and data. The firmware may be a software program or set of instructions embedded in or programmed on the processor(s) which provides the necessary instructions for how the processor(s) operate and communicate with other hardware. The firmware may be stored in the flash memory (ROM) of the processor(s) as a binary image file and may be erased and rewritten. The firmware may be considered "semi-permanent" since it remains the same unless it is updated. This firmware update or load may be handled by a device driver.

The processor(s) may be utilized to perform a number of functional operations, which may involve the performance of a number of related steps, the particulars of which may be determined by or based upon certain configuration settings stored in firmware or memory which may be any one of a number of memory types such as RAM, ROM, EEPROM, etc. In addition some memory functions may be stored in memory provided as part of the processor(s).

Exemplary functions of the processor(s) may be controlling operation the scan engine, decoding functions and operator interface functions. Operating software may be utilized to operate the processor(s) for such functions seemingly simultaneously or in a multitasking role. An exemplary image reader operating software architecture may be organized into processes or threads of execution.

Processor(s), memory and associated circuitry which perform or control the exemplary scan and decoding functions may be provided in the scan engine or on associated circuit boards which are disposed within the housing of the reader. Decoding is a term used to describe the interpretation of a machine readable code contained in the photodetector output signal.

An exemplary function of the processor(s) may be to decode machine readable symbology provided within the target or captured image. One dimensional symbologies may include very large to ultra-small, Code 128, Interleaved 2 of 5, Codabar, Code 93, Code 11, Code 39, UPC, EAN, MSI, or other 1D symbologies. Stacked 1D symbologies may include PDF, Code 16K, Code 49, or other stacked 1D symbologies. 2D symbologies may include Aztec, Datamatrix, Maxicode, QR-code, or other 2D symbologies.

Operation of the decoding, which may be executed in a user or factory selectable relationship to a scanning routine, may be governed by parameters or configuration settings. Combinations of scanning and decoding parameters together define scanning-decoding relationships or modes which the reader will use. Two exemplary modes may be continuous or discontinuous. In the continuous mode (also referred to as continuous scanning mode, continuous streaming mode, streaming mode, fly-by scanning mode, on the fly scanning mode or presentation mode) the reader is held in a stationary manner and targets (such as symbols located on packages) are passed by the reader. In the continuous mode, the reader takes continuous scans one after another (seriatim) and continuously decodes or attempts to decode some or all scanned targets. Discontinuous mode is a mode wherein scanning and/or decoding stops or is interrupted and initiated with an actuation event, such as pulling of a single pull trigger 115, a timeout, or a successful read to restart. An exemplary utilization of the reader in discontinuous mode is via hand held operation. Decoding stops once the indicia reader is no longer triggered. The discontinuous mode is typically initiated because the operator knows a symbol is present.

Exemplary indicia readers may use memory or firmware to store certain reader settings or reader configuration settings. Exemplary configuration settings may be selection of scanning distance, trigger functionality, pre-defined bar code output data based on the scan input, continuous scanning mode, discontinuous scanning mode or routine, decoding mode or routine, I/O configurations, symbology enablement, output interface functionality, min/max symbology character lengths, scan engine selection, illumination functionality, settings that affect the functional operation of the processor(s), which codes are enabled for processing, aimer operation, engine orientation, illumination, photosensor functionality, software control, sales tracking or warranty tracking, reader capabilities, etc.

Readers and a host system may be equipped with the ability to automatically query and communicate data, such as configuration settings or firmware amongst each other. Upgrading firmware from host to reader and duplicating configuration settings may be performed without human intervention to ensure readers are operating at the same revision and have the same configuration settings reduces user frustration, down time, data integrity and increase efficiencies.

At predetermined time intervals a host system may broadcast various information, such as firmware revision, configuration settings, etc. The host may then download the newer files and update readers during a time of inactivity. Readers may use on board memory or firmware flash memory to store certain configuration settings.

Readers may be configured via serial connection using serial commands. A GUI interface may be utilized for creating or reading serial commands, such as Visual Menu or similar such product. This may be done locally or remotely by connecting the optical reader either directly or through a network (such as the internet) to a remote computer and having the remote computer provide software upgrades.

Software upgrades may be necessary for migration from one reader to new or other readers, possibly different manufacturers. Upgrading may be simplified if the configuration of the reader being replaced is matched or matches the configuration of the equipment that it is replacing.

If reader software is replaced, the reader may have the ability to automatically read out configuration settings information in memory and allow the software to adapt and use different methods of control, or different methods of decoding, etc.

An exemplary embodiment for upgrading may be to provide a PC based software tool to read out the non-default configuration settings from a target reader device (the one being replaced) through a serial communication and then to flash the same or equivalent settings into the replacement equipment. This may be considered a direct configuration mapping method, that is, reading the configuration settings on a (old) Device A and flashing them into a (new) Device B.

Another exemplary embodiment may be to provide a PC based software tool that analyzes output scanned data of a known information bearing indicia from a target reader (the one being replaced) and compares it with the output scanned data from the replacement reader. The software tool may interpret how the existing device is configured based on the difference between the two sets of scanned data. After interpolation of the configuration settings of the replacement reader, the software tool may configure the replacement reader to match the old or replacement reader. This may be considered indirect mapping, wherein the software tool interpolates the inner settings of an existing device from its operation, rather than by direct read out from memory or firmware.

Either exemplary embodiment may be integrated with a cross-browser, client-side DHTML menu builder such as Visual Menu. The configuration of a reader may be read out once and then propagated many times using wireless or over-the-net configuration utilities, hard copy or video display menuing or other suitable means.

A user may update or replace one or more stored configuration settings or configuration setting data utilizing a remote updating system which may be done by connecting the reader either directly or through a network (such as the internet) to a remote processor. With appropriate software, the remote processor may be programmed to read certain configuration settings from the reader, such as software configuration. The remote processor may read the configuration setting data and utilize that data when downloading updates or new software. An operator may request from the remote processor for a software update. The request may be received by either computer, which could read the current software configuration resident on the optical reader and determine the appropriate update or replacement software.

Certain bar code symbology types have special data codewords or characteristics which identify them as to be used for configuration. Bar codes which are created utilizing these codewords or characteristics are commonly referred to as configuration bar codes, menuing bar codes, or menuing information bearing indicia (IBI). Typically, a scanning device will come with a manual which has configuration bar codes inside which are used to specifically configure that device. The data contained in the configuration bar code is used to identify which setting to address, and what value to load for that setting. In some cases if the setting has a range of acceptable values which is very large, several configuration bar codes, one which addresses the setting and one or more others which define the value, are scanned in succession to configure the setting.

In an exemplary embodiment, an indicia reader may be configured by reading IBIs from a user's application (i.e. not menuing bar codes) to configure the reader for setup in their application. Hand held barcode scanning devices are typically utilized for dual purpose scanning.

A reader may be removably placed or held in a cradle for storage. A user may need to go between both hand held use and stand mounted use for presentation scanning. Or a user may need to temporarily place a reader on a stand while the reader is not being used.

In an exemplary embodiment, a reader may contain a small metal plate or magnet. The cradle may contain a strong magnet that, when the reader is placed into the cradle the magnets will attract securing the unit to the cradle.

The benefit of this exemplary open frame design requires no insertion from the user, but rather the user can float the unit under the cradle and feel the attraction of the magnets. The user should be able to quickly insert and retract the reader with minimal interference or scratching of the reader. The open frame design requires the reader to be attached on only one side.

Figure 3:
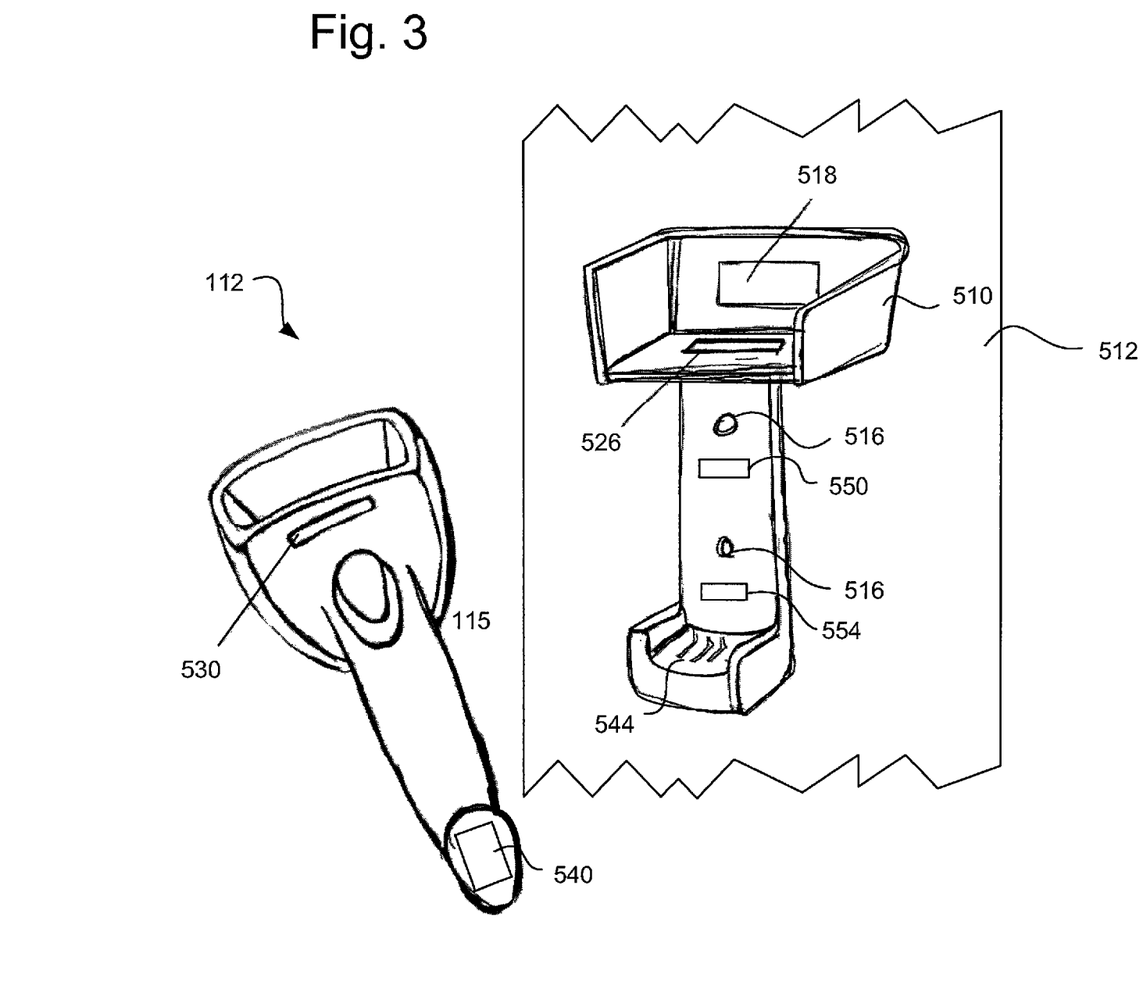
FIG. 3 is a plan view of an exemplary indicia reader system.
Figure 4:
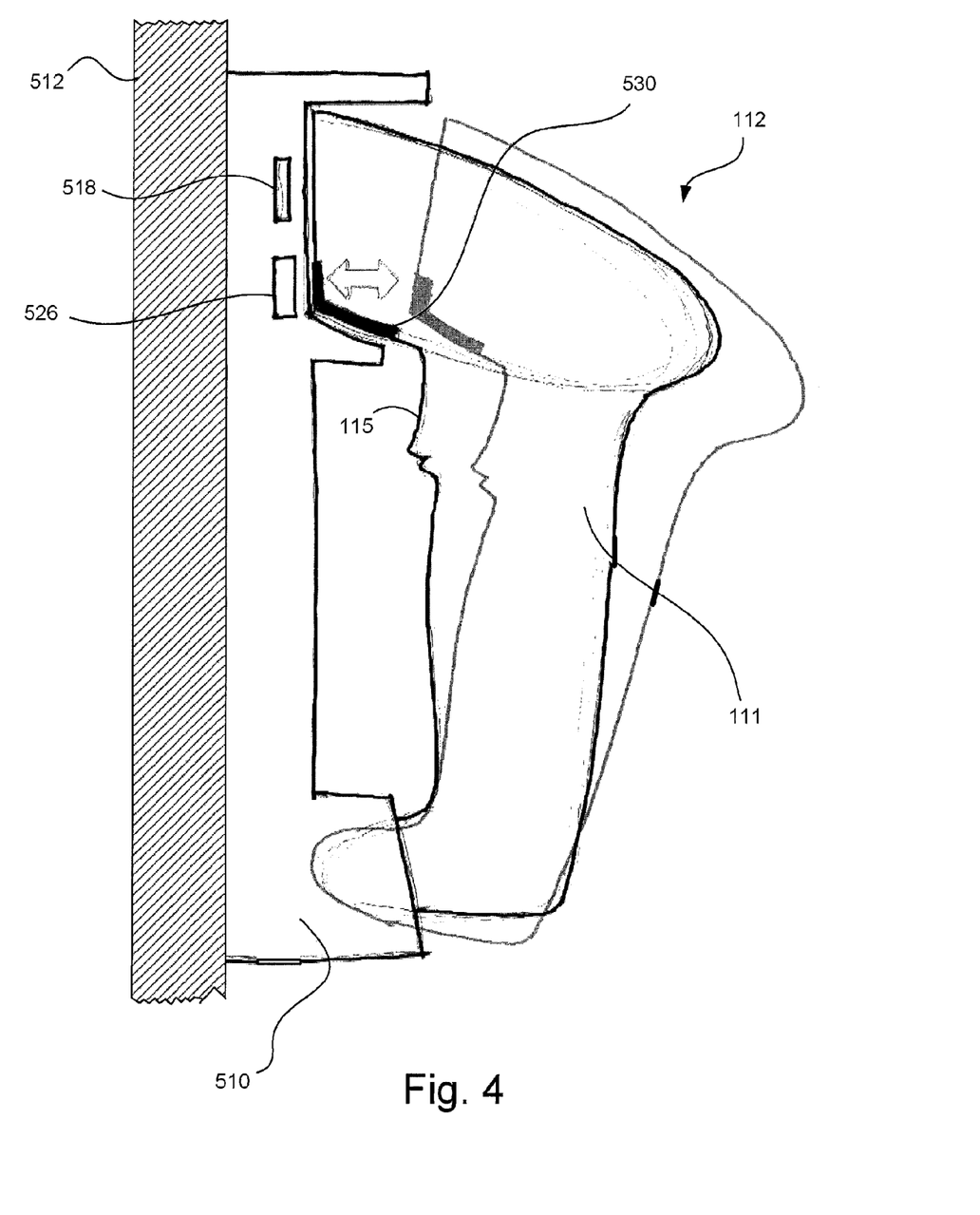
FIG. 4 is a side view of an exemplary indicia reader system.

FIGS. 3 and 4 illustrate exemplary cordless reader systems wherein a cradle 510 may be used to hold a reader 112. A cordless hand held indicia reader needs to charge periodically in a base or cradle system. In an exemplary embodiment, charging cradle 510 mounts vertically to a wall or other upright surface 512 utilizing a mounting mechanism, such as one or more screws 516, anchors, etc. . . . Similar to a wall mount phone, the cordless hand held may have an attachment mechanism for securing it to the cradle when mounted substantially vertically.

FIG. 4 illustrates an exemplary indicia reader in cradled and partially un-cradled positions.

In an exemplary embodiment, the attachment mechanism is an electromagnet 526 disposed in or on the cradle with a complimentary magnet or paramagnetic material 530 provided on or in the reader. The paramagnetic material 530 may be configured as a strip piece or bar and comprised of a number of magnetic materials, such as a permanent magnet or metals or plastics that are affected by electromagnetic force that attracts them to magnets. An exemplary electromagnet is a type of magnet whose magnetic field is produced by the flow of electric current. The magnetic field collapses or disappears when the current ceases.

In an exemplary embodiment, a scanner may be secured or held to many types of bases in any position through a process referred to herein as flux transfer wherein a scanner remains secure while inactive and can be released when a user grips the scanner and activates a trigger to un-cradle the scanner. An activation device other than a trigger, such as a button on the scanner or on the cradle may also be utilized to permit removal of the scanner from the cradle.

In an exemplary embodiment, a magnet is disposed on a charge cradle and a small piece of metal is disposed on a scanner. The scanner may be held to the cradle by the magnet to plate interaction. To release the scanner from the cradle, a user may pull the scanner trigger. Light emitted by the scanner activated when the trigger is pulled may be stimulate a light sensor 518 in the cradle, which causes control circuitry 520 to change the electromagnet current generating circuitry in the cradle which may cause a reversal of the polarity of the magnet or ceasing the magnetic field to release the magnets hold on the reader.

In an exemplary embodiment, the magnet may be disposed far enough from the scanners main electronics (such as on the heel) to avoid any interference with the scanner performance.

In an exemplary embodiment, the magnet may not need a trigger activation or an electronic current to disengage. Strategic placement of the magnet and plate components could render a secure enough hold and yet light enough to remove with mild resistance. In an exemplary embodiment, the magnet in the cradle may be a permanent magnet or electromagnet and the magnet in the reader a permanent magnet.

Figure 5:
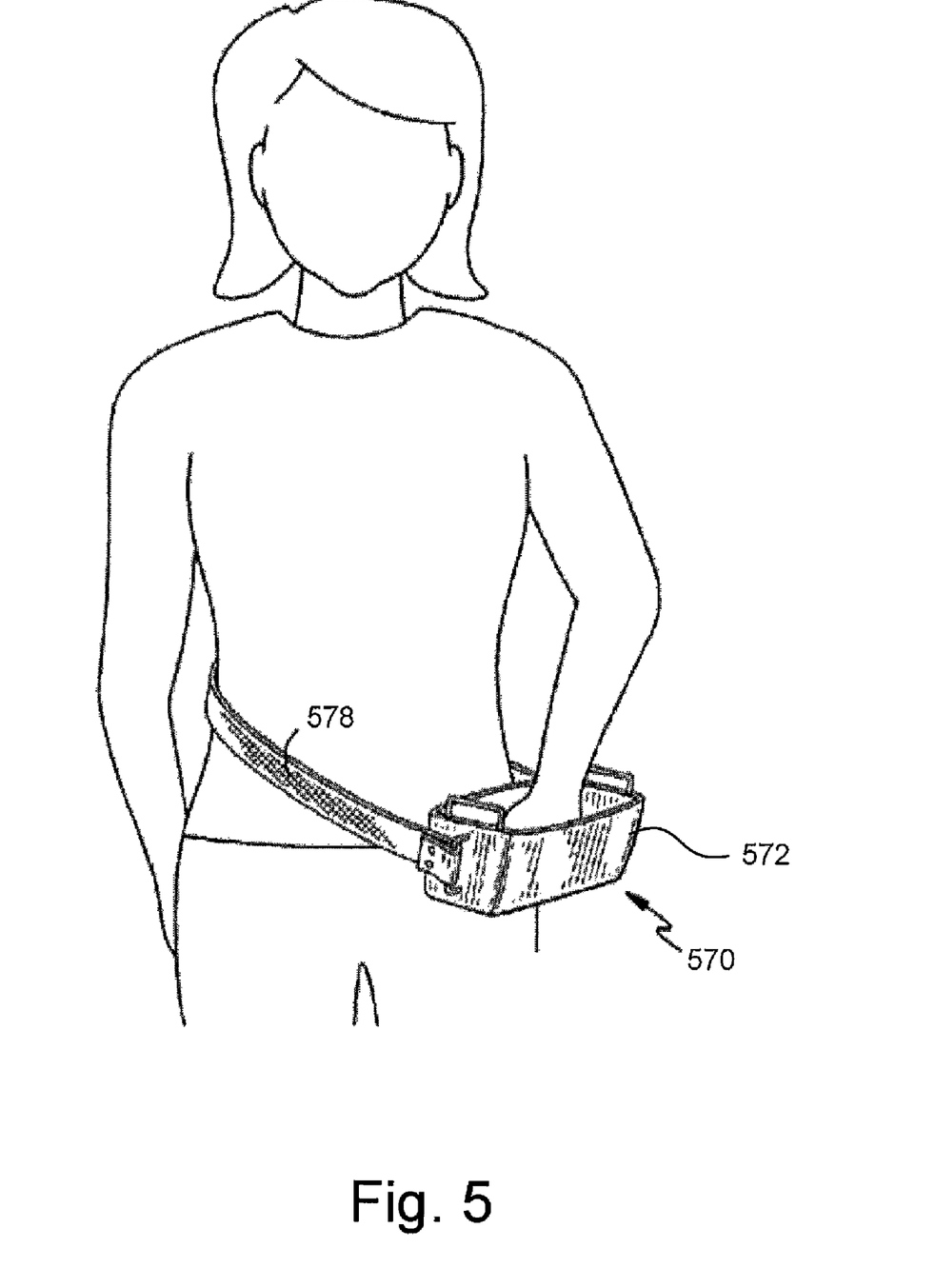
FIG. 5 is a pictorial illustration of a hand held indicia reader cradle being worn as a waist belt.

In an exemplary embodiment, the cradle may be "wearable" in the form of a holster. FIG. 5 illustrates an exemplary wearable carrier 570 having a shell 572 supported by strap 578 worn around or on an operator as a waist belt. A magnet may be disposed in the shell which helps retain an indicia reader in the exemplary manners described herein.

Figure 6:
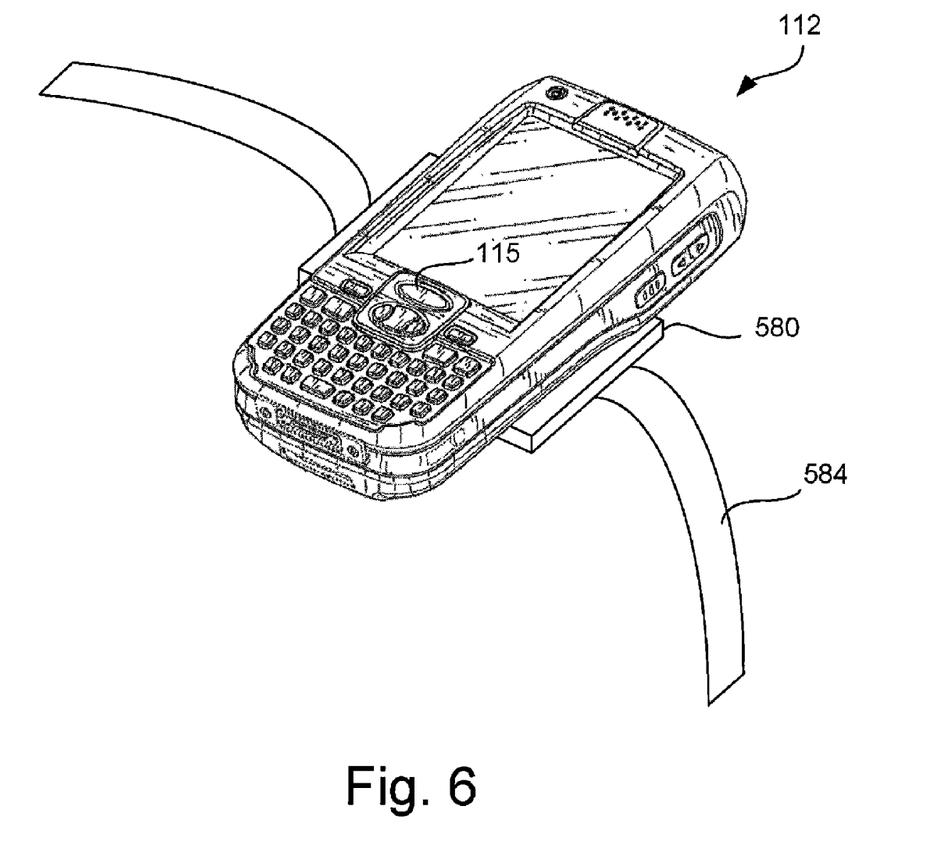
FIG. 6 is a plan view of an exemplary indicia reader system.

In an exemplary embodiment, the cradle or platform 580 may be "wearable" in the form of a wrist strap or arm band. FIG. 6 illustrates an exemplary wearable carrier 580 having a strap 584 worn around or on an operator's wrist or arm. A magnet may be disposed in the platform 580 which helps retain an indicia reader in the exemplary manners described herein.

In an exemplary embodiment, the attachment mechanism is a system which allows quick and easy removable attachment of a reader to a cradle, such as a fabric hook-and-loop, burr or touch fasteners such as Velcro® or something similar.

In an exemplary embodiment, an electrical connector 540 is disposed on the reader to electrically connect with an electrical connector 544 disposed on the cradle arm. The connectors provide electrical connectivity between the reader and the cradle for charging and communication.

In exemplary embodiments, the reader may communicate wirelessly or via a wire with the cradle or a server.

The cradle may have a reading instrument or detector 550, such as an RFID reader and associated circuitry/connectivity for making RF payments or for article detection. The cradle may also have a proximity reader 554 for detecting or reading information from items placed in proximity to the cradle. A proximity detector may be utilized to trigger the reader for such things as activating illumination, activating an aimer, changing decoding algorithms, changing decoding modes, operating modes, operating characteristics, etc. The reader may be configured to sense that it is in the cradle and thereby change the operating mode when it is either cradled in the cradle or removed from the cradle rather than rely upon a trigger pull to change the operating mode. An exemplary configuration may be a mechanical switch or microswitch that is activated when the reader is placed in the cradle. It may also be a microswitch that is activated by a mechanical feature in the scanner cradle. It may also be a magnetically actuated read relay that responds to a permanent magnet on or in the scanner cradle.

In an exemplary embodiment, the attachment mechanism is a magnet or paramagnetic material disposed in or on the cradle with a complimentary magnet or paramagnetic material provided on or in the reader. The paramagnetic material may be configured as a strip piece or bar and comprised of a number of magnetic materials, such as a permanent magnet or metals or plastics that are affected by electromagnetic force that attracts them to magnets.

Operation of the scanning, which may be executed in a user or factory selectable relationship to a scanning routine, may be governed by parameters which control the codes which are enabled for processing as a part of an autodiscrimination process, whether decoding is to be continuous or discontinuous, etc. Permitted combinations of scanning and decoding parameters together define the scanning-decoding relationships or modes which the reader will use. In the continuous mode (also referred to as continuous scanning mode, continuous streaming mode, streaming mode, fly-by scanning mode, on the fly scanning mode or presentation mode) the reader is held in a stationary manner and targets (such as symbols located on packages) are passed by the reader. In the continuous mode, the reader takes continuous scans seriatim (one after another) and continuously decodes or attempts to decode some or all of these images. In the continuous mode exposure times and decoding times are limited.

In an exemplary embodiment, continuous mode entails the reader sensing the presence of an object or an information bearing indicia placed within the scanning field of view of the reader and thereafter scanning an information bearing indicia.

Discontinuous mode is a mode wherein scanning and/or decoding stops or is interrupted and must have an actuation event, such as pulling or pushing of a trigger or placing an IBI in the reader field of view. An exemplary utilization of the reader in discontinuous mode is via hand held operation. While triggered, the reader may expose images continuously and decode images continuously. Decoding stops once the reader is no longer triggered. Exposing of images, however may continue. In the discontinuous mode, the exposure time, decoding time out limits and decoding aggressiveness may be increased more than those set for continuous mode. It is to be noted that the discontinuous mode is typically initiated because the operator knows a symbol is present. The decoder therefore may forego making a determination of the presence of a symbol because a symbol is presumed to be in the field of view. Discontinuous mode may provide longer range scanning than the continuous mode. Switching between continuous and discontinuous modes may be accomplished by use of a trigger disposed on the reader. For example, when the trigger is depressed by an operator the reader may operate in a discontinuous mode and when the trigger is released the reader may switch to continuous mode after a predetermined period of time. A scanning subroutine may specify an address buffer space or spaces in which scan data is stored and whether scanning is to be continuous or discontinuous. Another example of switching between continuous and discontinuous modes may be accomplished by symbology wherein switching between the modes depends on the type of symbology detected. The reader may stop attempting to decode a symbol after a predetermined time limit. The reader may limit the type of symbols to decode when in the continuous mode.

The reader aiming pattern generator may be programmed to operate in either continuous or discontinuous modes.

In the continuous mode, the present device may be configured to automatically switch to a reduced power state if no symbol has been sensed for a period of time. Upon sensing of a symbol the reader may then automatically switch back to the higher power state continuous mode. In this reduced power state the reader may change from having the aimer and/or illumination light sources on for every scan to having either/or on for only some of the scans (e.g. every 2 or 3 or less scans). In this manner the system may still be in a position to sense the presence of a symbol, but will draw less current and also generate less internal heating. After sensing a symbol, the reader may utilize aiming/illumination for every scan until another period of inactivity is sensed. Mode changes may be accomplished by a host computer in response to an appropriate signal over either a direct connection or wireless connection to the reader.

The exemplary cradle provides quick and easy placement and removal of a reader in the cradle which prevents scratching of the reader with repeated placement and removal.

An indicia reading system includes: a hand held indicia reader for reading information bearing indicia; a cradle having a first magnetic attachment device disposed in the cradle arm for removably holding the indicia reader; a second attachment device disposed on the indicia reader to removably attach the indicia reader to the first magnetic attachment device.

In an exemplary embodiment a magnet utilized to hold a scanner to the cradle may also be used as security to prevent theft of the scanner. The magnet may only be activated when set by the user during certain times. The strength of the magnet may also be controlled by a signal transmitted from the scanner. In an exemplary embodiment, the transmitted signal may be light emitted by the scanner, a signal (such as a rf signal) sent by the scanner or the establishment, etc. Magnetic security systems may be electromagnetic tags made of a strip of amorphous metal (i.e. metglas) which has a very low magnetic saturation value. Except for permanent tags, this strip may also be lined with a strip of ferromagnetic material with a moderate coercive field (magnetic "hardness"). Detection is achieved by sensing harmonics and sum or difference signals generated by the non-linear magnetic response of the material under a mixture of low-frequency (in the 10 Hz to 1000 Hz range) magnetic fields.

When the ferromagnetic material is magnetized, it biases the amorphous metal strip into saturation, where it no longer produces harmonics. Deactivation of these tags is therefore done with magnetization. Activation requires demagnetization.

This system is suitable for items in libraries since the tags can be deactivated when items are borrowed and re-activated upon return. It is also suitable for low value goods in retail stores, due to the small size and very low cost of the tags.

Acousto-magnetic security systems are similar to magnetic tags in that they are made of two strips, a strip of magnetostrictive, ferromagnetic amorphous metal and a strip of a magnetically semi-hard metallic strip, which is used as a biasing magnet (to increase signal strength) and to allow deactivation. These strips are not bound together but free to oscillate mechanically.

The detectors for such tags emit periodic tonal bursts (such as about 58 kHz) with the same resonance frequency of the amorphous strips. This causes the strip to vibrate longitudinally by magnetostriction, and to continue to oscillate after the burst is over. The vibration causes a change in magnetization in the amorphous strip, which induces an AC voltage in a receiver antenna. If this signal meets the required parameters (correct frequency, repetition etc.) an alarm is activated.

When a semi-hard magnet is magnetized, the tag is activated. The magnetized strip makes the amorphous strip respond much more strongly to the detectors, because the DC magnetic field given off by the strip offsets the magnetic anisotropy within the amorphous metal. The tag can also be deactivated by demagnetizing the strip, making the response small enough so that it will not be detected by the detectors.

An exemplary indicia reading system includes: a hand held indicia reader for reading information bearing indicia, the indicia reader having a trigger for activating the reader; a cradle having a first magnetic attachment device disposed in the cradle arm for removably holding the indicia reader through magnetic attraction and a sensor; a second attachment device disposed on the indicia reader to removably attach the indicia reader to the first magnetic attachment device; and, an activation device for activating the sensor to eliminate the magnetic attraction between the first and second magnetic attachment devices when an operator wishes to un-cradle the indicia reader.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The invention claimed is:

1. An indicia reading system comprising:
a hand held indicia reader for reading information bearing indicia;
a cradle having a first magnetic attachment device disposed in the cradle arm for removably holding the indicia reader; and,
a second attachment device disposed on the indicia reader to removably attach the indicia reader to the first magnetic attachment device,
wherein the hand held indicia reader has a trigger or button a user activates to permit un-cradling of the hand held indicia reader
wherein when the trigger or button is activated a light is emitted by the scanner to stimulate a light sensor in the cradle, causing a control circuitry to change the polarity of the first magnet.

2. An indicia reading system in accordance with claim 1, wherein the first magnetic attachment device is an electromagnet.

3. An indicia reading system in accordance with claim 1, wherein the first magnetic attachment device is a permanent magnet.

4. An indicia reading system in accordance with claim 1, further comprising a sensor disposed in the cradle for detecting whether the indicia reader is cradled or not.

5. An indicia reading system in accordance with claim 1, further comprising a sensor disposed in the cradle for detecting whether the indicia reader is cradled or not and wherein the operational characteristics of the indicia reader change whether the indicia reader cradled.

6. An indicia reading system in accordance with claim 1, further comprising a sensor disposed in the cradle, and wherein the indicia reader is released from the first magnetic attachment device when the sensor is activated.

7. An indicia reading system in accordance with claim 1, further comprising a first electrical connector disposed on the indicia reader to electrically connect with a second electrical connector disposed on the cradle to electrical connectivity between the indicia reader and the cradle when the indicia reader is cradled.

8. An indicia reading system in accordance with claim 1, wherein the cradle is configured to be attached to a substantially vertical surface.

9. An indicia reading system in accordance with claim 1, wherein the cradle is configured to be worn on an operator.

10. An indicia reading system comprising:
a hand held indicia reader for reading information bearing indicia, the indicia reader having a trigger for activating the reader;
a cradle having a first magnetic attachment device disposed in the cradle arm for removably holding the indicia reader through magnetic attraction and a sensor;
a second attachment device disposed on the indicia reader to removably attach the indicia reader to the first magnetic attachment device; and,
an activation device for activating the sensor to eliminate the magnetic attraction between the first and second magnetic attachment devices when an operator wishes to un-cradle the indicia reader
wherein when the activation device is a light is emitted by the scanner to stimulate a light sensor in the cradle.

11. An indicia reading system in accordance with claim 10, wherein the first magnetic attachment device is an electromagnet.

12. An indicia reading system in accordance with claim 10, wherein the first magnetic attachment device is a permanent magnet.

13. An indicia reading system in accordance with claim 10, further comprising a sensor disposed in the cradle for detecting whether the indicia reader is cradled or not.

14. An indicia reading system in accordance with claim 10, further comprising a first electrical connector disposed on the indicia reader to electrically connect with a second electrical connector disposed on the cradle to electrical connectivity between the indicia reader and the cradle when the indicia reader is cradled.

15. An indicia reading system in accordance with claim 10, wherein the cradle is configured to be attached to a substantially vertical surface.

16. An indicia reading system in accordance with claim 10, wherein the cradle is configured to be worn on an operator.

17. An indicia reading system in accordance with claim 1, wherein the first and/or second magnetic attachment device is activated when set by the user selectively at predetermined times.

18. An indicia reading system in accordance with claim 1, wherein the first the strength of the first and/or second magnetic attachment device is controlled by a signal transmitted from the hand held indicia reader.

* * * * *